May 3, 1966  J. B. PETERSON  3,249,027
MULTIPLE WHEEL COMPACTOR
Filed Sept. 22, 1960  3 Sheets-Sheet 1
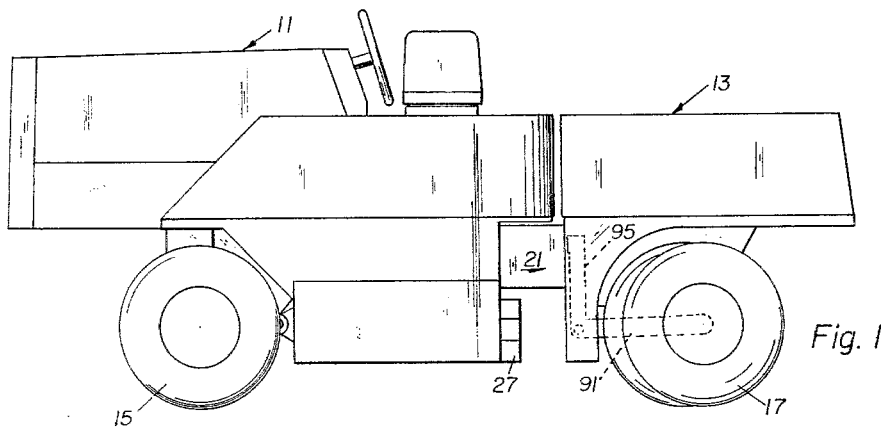
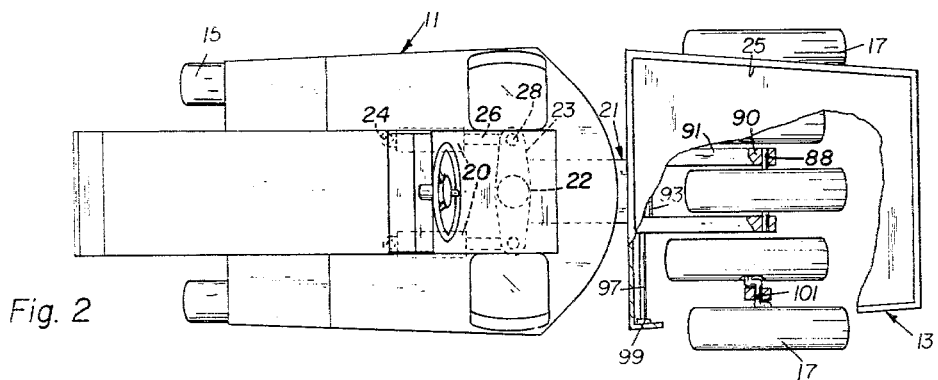
INVENTOR.
Jack B. Peterson
BY
Buckhorn, Cheatham & Blore
ATTORNEYS

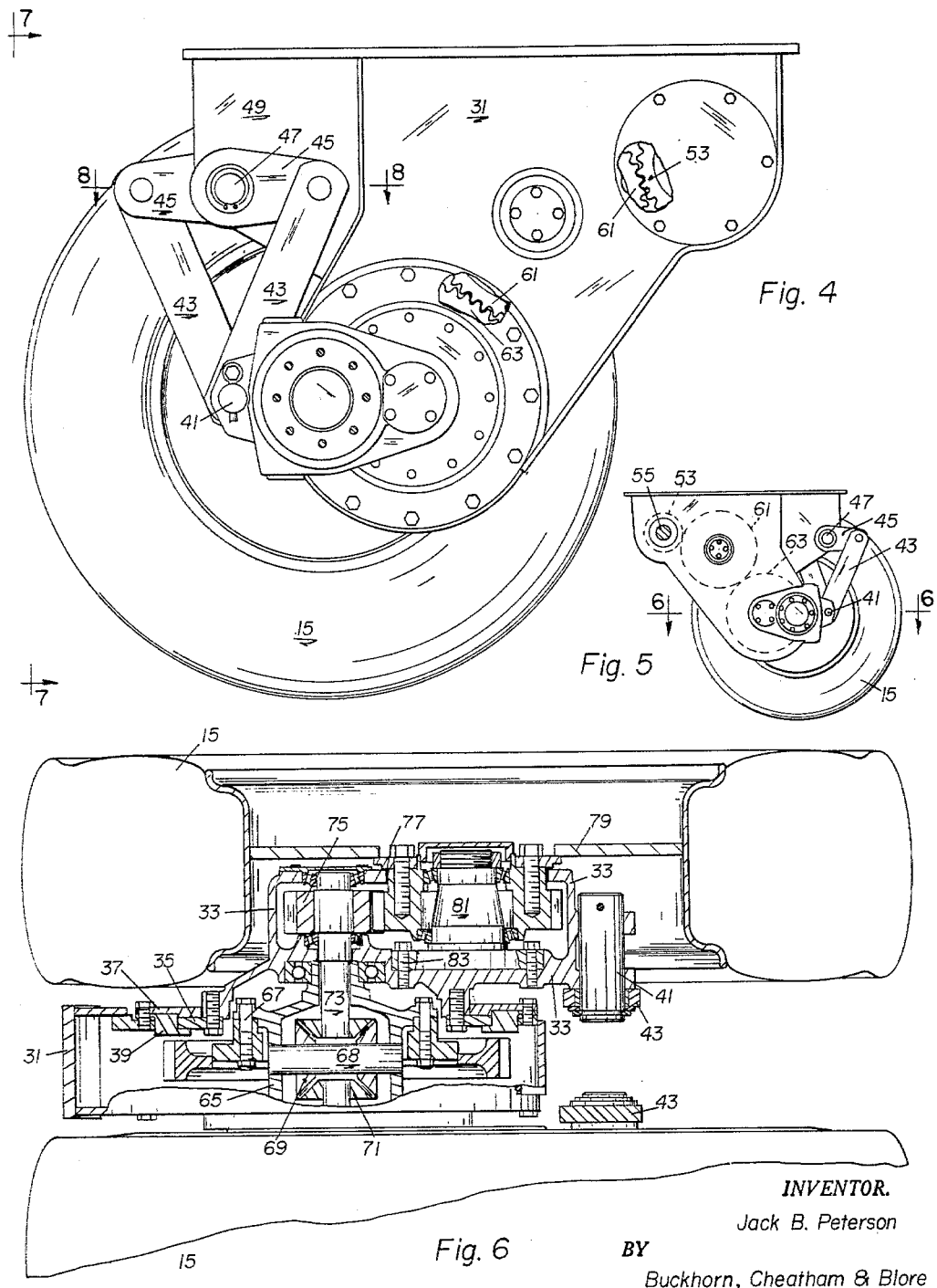

May 3, 1966  J. B. PETERSON  3,249,027
MULTIPLE WHEEL COMPACTOR

Filed Sept. 22, 1960  3 Sheets-Sheet 3

INVENTOR.
Jack B. Peterson
BY
Buckhorn, Cheatham & Blore
ATTORNEYS

_United States Patent Office_

3,249,027
Patented May 3, 1966

3,249,027
MULTIPLE WHEEL COMPACTOR
Jack B. Peterson, Portland, Oreg., assignor to Hyster
Company, Portland, Oreg., a corporation of Nevada
Filed Sept. 22, 1960, Ser. No. 57,653
10 Claims. (Cl. 94—50)

This invention relates to compaction rollers of the type used in constructing roads, parking areas and the like, and particularly to multiple wheel compaction rollers.

Compaction rollers of the type under consideration normally have the two or more rows or sets of wheels so mounted that relative vertical movement between the wheels in a row is permitted. This prohibits excessive weight from being imposed on a single wheel, in case the wheel rides over a rock or high spot, and maintains the same wheel load in case the wheel drops into a hole or low spot.

In so mounting the driving wheels, in prior compactors, scuffing of the working surface has resulted because of the increased peripheral speed of the wheel riding over the high or low spot as compared to that of the companion wheels not contacting such spot. This scuffing is particularly objectionable when preparing asphalt surfaces.

A main object of the present invention is to provide a multiple wheel compactor having the driving wheels thereof so mounted and driven that while relative vertical bodily movement is permitted between the wheels, to avoid bridging the low spots, the peripheral speed of the wheels is so controlled as to avoid scuffing.

Another object is to provide a multiple wheel compactor having a novel manner of driving and mounting certain wheels thereof, and particularly so driving said wheels that the wheels can move at different speeds when the compactor is turning to avoid scuffing the surface being compacted.

Various other objects of the invention will be apparent from the following description taken in connection with the accompanying drawings in which:

FIG. 1 is a side view of a compactor of the invention;

FIG. 2 is a top view of the compactor with parts broken away for clarity;

FIG. 2A is a view, partly in section, on an enlarged scale showing the mounting details of the outermost pair of rear wheels in the lower portion of FIG. 2;

FIG. 3 is a front view of the compactor;

FIG. 4 is a fragmentary side elevation taken along line 4—4 of FIG. 3, on an enlarged scale, but with a wheel removed for clarity;

FIG. 5 is a vertical section taken along line 5—5 of FIG. 3, but on a scale smaller than FIG. 4, a wheel being removed for clarity;

FIG. 6 is a horizontal section taken along line 6—6 of FIG. 5 and being on an enlarged scale;

_General description_

Figure 7:
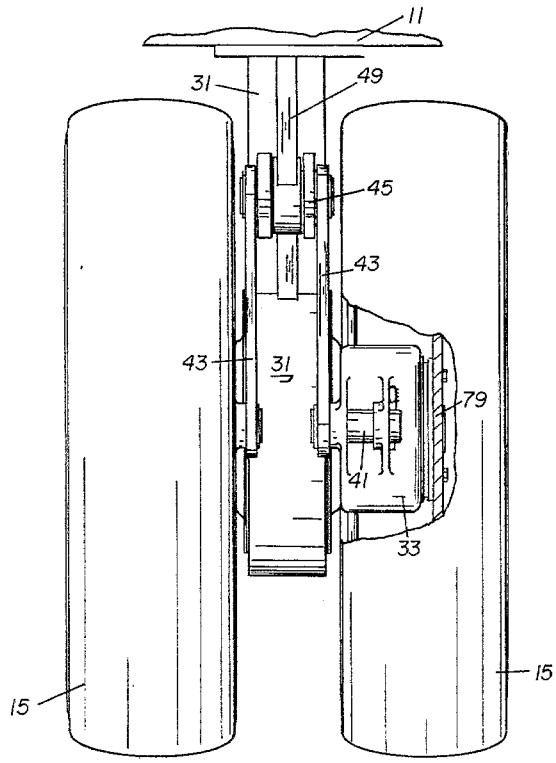
FIG. 7 is a front elevation taken in the direction of the arrows 7—7 of FIG. 4.
Figure 8:
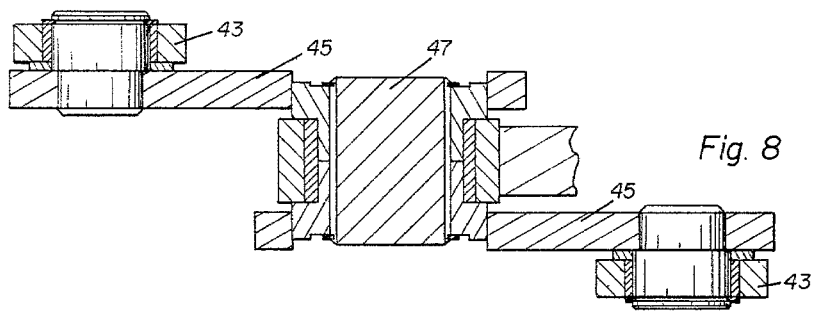
FIG. 8 is a horizontal section on an enlarged scale taken along line 8—8 of FIG. 4.

The compactor comprises two sections 11 and 13, which for convenience will be called the front section 11 and the rear section 13, although the reverse terminology could be used since in operation, the vehicle is driven in one direction about as much as the opposite direction.

The front section 11 is supported by a plurality of wheels 15, four being shown (FIG. 3). The rear section 13 is supported by a plurality of wheels 17, five being shown (FIG. 2) and being arranged in staggered relation with respect to the front wheels as best shown in FIG. 3.

The front and rear sections are connected by a sleeve type connection 21 of conventional form which permits relative turning movement of the sections about a longitudinal axis. The connection also includes a vertical pivot 22 between the sections so that the sections can be turned relative to each other for steering purposes. A sleeve-type connection and a vertical pivot between the sections like those shown are illustrated in greater detail, for example, in United States Patent No. 2,827,715, issued March 25, 1958, to E. A. Wagner, and more specifically in FIGS. 3 and 4 of such patent. The connection further includes a hydraulic-cylinder-type pivoted steering assembly 23 also of conventional form for effecting relative pivotal movement of one section with respect to the other. This steering assembly is illustrated in dashed lines in FIG. 2 and includes a pair of hydraulic cylinders 20 connected at one end at 24 to the front section 11 and having rearwardly extending piston rods 26 pivoted at 28 to lever arm 23 on the rear section 13.

The rear section provides a box 25 (FIG. 2) to receive sand or other suitable weight material, while weights 27 are suspended from the lower part of the front section in any suitable manner.

_Specific description_

The four front wheels 15 are driven and are arranged in pairs, each pair being similarly mounted and driven. One wheel assembly is shown in FIGS. 4, 5 and 6. Each wheel assembly includes a hollow narrow case 31 secured at its upper portion to the body of the front section 11.

Within each wheel is a small gear housing 33 (FIG. 6) having at its rear end an annular flange 35 rotatably received between a pair of flanges 37 and 39 on the case 31. Each housing functions as a lever and has its wheel rotatably connected thereto intermediate the length of the housing in a manner to be presently described. Each housing is connected at its front by a pivot shaft 41 (FIGS. 4 and 6) to the lower end of a link 43. The two links 43 of a wheel assembly diverge upwardly (FIG. 4) and are pivotally connected to oppositely directed cranks 45 of a crankshaft 47. The crankshaft 47 is journaled in a heavy front flange 49 of the case 31.

It is thus apparent that a pair of wheels are so connected to their case 31 that upward movement of one wheel must be accompanied by downward movement of the other wheel, and vice versa. This serves as an equalizer system so that if one wheel rides upon a rise, the loads imposed on such one wheel and its companion wheel will remain substantially equal.

Each case mounts an upper gear 53 (FIG. 5) driven by an output shaft 55 (FIGS. 5 and 3) of a differential 57. The latter is driven by the engine (not shown) mounted in the front section 11.

The gear 83 drives an idler gear 61 (FIG. 5) which drives a ring gear 63 (FIGS. 5 and 6). The ring gear surrounds a differential housing 65 (FIG. 6) and is secured by bolts 67 to such housing. The housing 65 supports a planet gear shaft 68 having bevel planet gears 69 engaging bevel output gears 71, there being one output gear for each wheel 15. Each gear 71 has a shaft 73 driving a spur gear 75 in turn driving a gear 77 bolted to the disk 79 of its wheel 15. Each shaft 73 is journaled in the associated housing 33.

Each wheel 15 is rotatably connected to its housing 33 by having its gear 77 rotatably supported on a stub axle 81 secured by bolts 83 to the housing 33.

_Operation_

Let it be assumed that the upper wheel in FIG. 6 rides over a rise in an asphalt surface which is being compacted. It will be urged to rotate a little faster than the lower wheel because of the greater distance the periphery of the wheel must travel. This faster rotation is permitted by the differential 65 so that no scuffing of the asphalt surface occurs.

When the vehicle is moving along a curved path, the four front wheels will be urged by frictional contact with the surface being compacted to travel at different speeds. The differential 57 and the differentials 65 permit such action so that no scuffing results.

Rear wheels

The five rear wheels are mounted in the following manner. The central wheel has an axle 88 journaled in a bearing 90 within a rear end portion of each of a pair of angle members 91 (FIGS. 1 and 2) journaled at their lower front portions on the body of the vehicle section 13. A sleeve 93 (FIG. 2) rigidly connects the angle members. The upstanding portions 95 (FIG. 1) of the members 91 serve as stops limiting counterclockwise bodily movement of the center wheel.

However, the portions 95 are normally maintained in spaced relation to opposed body portions of the vehicle sections 13 by a torsion bar 97 (FIG. 2). The bar 97 is anchored at 99 to the lower side of the rear section body, as the parts are shown in FIG. 2, and slidably extends through the near angle member 91 and is fixed to the far angle member 91. Thus a torsion bar suspension system is provided for the center wheel.

Each outer pair of wheels 17 is mounted on a crank 101 (FIG. 2) journaled in the frame or body of the rear vehicle section 13. More specifically, with reference to FIG. 2A, each opposite axle end 103 of crank 101 is journaled in bearings 105 within a hub 107 of one of the pair of outermost rear wheels 17, and the midportion of the crank between wheels is journaled in a sleeve and thrust bearing 108 within a center bearing block 109 carried on the underside of a rear extension arm 111 of the rear vehicle section 13. This provides an equalizing system for the outer pairs of wheels 17.

Having described the invention in what is considered to be the preferred embodiment thereof, it is desired that it be understood that the invention is not to be limited other than by the provisions of the following claims.

I claim:

1. In a comparator vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, a drive system extending from said engine into the spaces between and drivingly connected to the wheels of the first row, said drive system including differential means to allow for relative turning movement of each wheel of the first row relative to the other wheels of the first row, mounting mechanism for said first row wheels projecting into said first row spaces and mounting said first row wheels for vertical movement of each wheel relative to the others, said mounting mechanism including equalizing means to cause vertical movement of certain of said first row wheels in one direction in response to vertical movement of certain other of said first row wheels in the opposite direction to compensate for unevenness of the surface being compacted without interfering with the drive to said first row wheels.

2. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, a drive system extending from said engine into the spaces between and drivingly connected to the wheels of the first row, said drive system including differential means to allow for relative turning movement of each wheel of the first row relative to the other wheels of the first row, mounting mechanism for said first row wheels projecting into said first row spaces and mounting said first row wheels for vertical movement of each wheel relative to the others, said mounting mechanism including equalizing means to cause vertical movement of certain of said first row wheels in one direction in response to vertical movement of certain other of said first row wheels in the opposite direction to compensate for unevenness of the surface being compacted without interfering with the drive to said first row wheels, the portions of said equalizing means in a space being disposed in longitudinal alignment with the associated portions of said driving system which extend into such space.

3. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, a drive system extending from said engine into the spaces between and drivingly connected to the wheels of the first row, said drive system including differential means to allow for relative turning movement of each wheel of the first row relative to the other wheels of the first row, mounting mechanism for said first row wheels projecting into said first row spaces and mounting said first row wheels for vertical movement of each wheel relative to the others, said mounting mechanism including equalizing means to cause vertical movement of certain of said first row wheels in one direction in response to vertical movement of certain other of said first row wheels in the opposite direction to compensate for unevenness of the surface being compacted without interfering with the drive to said first row wheels, said differential means including differentials, each of which is physically and operatively disposed between a pair of wheels of the first row, a ring gear surrounding and drivingly connected to each differential, and a gear train for each ring gear extending from a place beyond the confines of the associated wheels to said ring gear and drivingly engaging the same, said gear train and ring gear being parts of said drive system.

4. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, means mounting said first row wheels for bodily movement solely in transverse vertical planes relative to the body mounting said first row of wheels, and with each first row wheel being mounted for vertical movement in a longitudinal plane relative to the other first row wheels, and means for driving said first row wheels while permitting relative rotational movement between the first row wheels, said first row including at least two pairs of first row wheels, said driving means including differential means between the pairs of first row wheels and differential means between the first row wheels of each pair.

5. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, means mounting said first row wheels for movement solely in transverse vertical planes relative to the body mounting said first row of wheels and with each first row wheel being mounted for vertical movement in a longitudinal plane relative to the other first row wheels, and means for driving said first row wheels while permitting relative rotational movement between the first row wheels, said first row including at least two pairs of first row wheels said driving means including differential means between the pairs of first row wheels and differential means between the first row wheels of each pair, said driving means comprising a single source of power for said first row wheels.

6. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, means mounting the first row wheels for vertical movement of each relative to the other first row of wheels and means for driving said first row wheels while permitting relative rotational movement between the first row wheels, said mounting means including a lever for each pair of first row wheels to an intermediate portion of which each of the associated first row wheels is rotatably mounted, equalizer link means for certain ends of the levers, and means rigidly interconnecting and mounting the other ends of the levers for pivotal movement about horizontal axes parallel to the axes of said first row wheels.

7. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, means mounting the first row wheels for vertical movement of each first row wheel relative to the other first row wheels while permitting relative rotational movement between the first row wheels, said mounting means including a lever for each pair of first row wheels to an intermediate portion of which each of the associated first row wheels is rotatably mounted, equalizer link means for certain ends of the levers, and means rigidly interconnecting and mounting the other ends of the levers for pivotal movement about horizontal axes parallel to the axes of said first row wheels, each lever comprising a gear housing including parts of said driving means.

8. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wide than the space with which it is aligned so the entire area between the outermost wheels is compacted in one pass of the vehicle, an engine on said body, means mounting the first row wheels for vertical movement of each first row wheel relative to the other first row wheels, and means for driving said first row wheels while permitting relative rotational movement between the first row wheels, said first row including at least two pairs of first row wheels, said driving means including differential means operationally disposed between the pairs of first row wheels and differential means operationally and physically disposed between the first row wheels of each pair, said mounting means including fixed housing means containing the second mentioned differential means and projecting down between the first row wheels to the level of the first row wheel axes, lever means pivoted about transverse axes on the lower portions of said housing means and connected to said first row wheels and equalizer means extending down between said first row wheels and said lever means.

9. In a compactor vehicle, a body supported by a first row of laterally spaced wheels and a second row of laterally spaced wheels, the second row of wheels being turnable as a unit relative to the first row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, means mounting the first row wheels for vertical movement of each first row wheel relative to the other first row wheels, and means for driving said first row wheels while permitting relative rotational movement between the first row wheels, said first row including at least two pairs of first row wheels, said driving means including differential means operationally disposed between the pairs of first row wheels and differential means operationally and physically disposed between the first row wheels of each pair, said mounting means including a lever for each pair of first row wheels, to an intermediate portion of which each of the associated first row wheels is rotatably mounted, each lever comprising a gear housing including parts of said driving means.

10. In a compactor vehicle, a body supported by a first row of laterally spaced wheels and a second row of laterally spaced wheels, one row of wheels being turnable as a unit relative to the other row of wheels to enable steering of said vehicle, the wheels of each row being aligned with the spaces of the other row, the ground engaging portion of each wheel being wider than the space with which it is aligned so the entire area between the outermost wheels is compacted in one pass of the vehicle, an engine on said body, a drive system extending from said engine into the spaces between and drivingly connected to the wheels of the first row, the wheels of said first row being arranged in pairs, said drive system including a gear case for each pair of wheels, each case being secured to said body and projecting downwardly between the associated wheels, a pair of transverse, horizontal, axially aligned shaft journaled in the lower portion of each case and projecting from such case in opposite directions, a differential in each case drivingly connected to the associated shafts, the drive to said differential including differential means to enable relative rotary movement of each first row wheel relative to each of the other first row wheels, a gear housing for each shaft journaled for pivoting movement about the axis of such shaft, there being a first row wheel mounted on each housing for rotary movement about an axis spaced generally horizontally from the associated shaft so that such wheel and housing can swing in a vertical plane, equalizing mechanism for each pair of first row wheels and being separate from said drive system, each equalizing mechanism including a transverse, horizontal equalizing shaft journaled for pivoting movement about an axis spaced from and parallel to the shafts associated with the associated wheels, a pair of cranks secured to said equalizing shaft and projecting in opposite directions therefrom, and a link for each crank pivotally connected at its opposite ends to its crank and the associated housing whereby the vertical movement of the associated front row wheels is equal but opposite, and such movement can occur without effecting the drive to such wheels, said links being disposed next to the interior faces of the associated housings whereby the drive system and equalizing mechanism can be accommodated within the space between a pair of wheels.

References Cited by the Examiner

UNITED STATES PATENTS

| | | | |
|---|---|---|---|
| Re. 14,801 | 2/1920 | Flory | 180—41 |
| 1,386,123 | 8/1921 | Lewis | 180—41 |
| 2,213,473 | 9/1940 | Peterman | 180—22 |
| 2,415,596 | 2/1947 | Larison | 180—22 |
| 2,551,314 | 5/1951 | Burton | 180—41 |
| 2,706,121 | 4/1955 | Ronning | 90—50 X |
| 3,015,997 | 1/1962 | Seaman | 94—50 |

FOREIGN PATENTS

| | | |
|---|---|---|
| 242,371 | 11/1925 | Great Britain. |
| 681,325 | 10/1952 | Great Britain. |

A. HARRY LEVY, *Primary Examiner.*

JACOB L. NACKENOFF, *Examiner.*

C. VAN VECHTER, *Assistant Examiner.*